(12) United States Patent
Pandel et al.

(10) Patent No.: US 6,606,414 B1
(45) Date of Patent: Aug. 12, 2003

(54) METHOD AND DEVICE FOR CODING A DIGITIZED IMAGE

(75) Inventors: Jürgen Pandel, Feldkirchen-Westerham (DE); Albert Salai, München (DE)

(73) Assignee: Siemens Aktiegesellschaft, Munich (DE)

( * ) Notice: Subject to any disclaimer, the term of this patent is extended or adjusted under 35 U.S.C. 154(b) by 0 days.

(21) Appl. No.: 09/423,132

(22) PCT Filed: Apr. 23, 1998

(86) PCT No.: PCT/DE98/01137

§ 371 (c)(1),
(2), (4) Date: Nov. 5, 1999

(87) PCT Pub. No.: WO98/51086

PCT Pub. Date: Nov. 12, 1998

(30) Foreign Application Priority Data

May 7, 1997 (DE) .......................................... 197 19 471

(51) Int. Cl.[7] .................................................. G06K 9/36
(52) U.S. Cl. ........................ 382/238; 382/236; 382/242
(58) Field of Search ................................. 382/236, 238, 382/232, 242, 239, 245, 251, 266, 270, 199; 375/240.13, 240.15, 240.12; 348/394.1, 401.1, 402.1, 404.1, 407.1, 424.2

(56) References Cited

U.S. PATENT DOCUMENTS

| 5,489,942 A | * | 2/1996 | Kawahara | 375/240.12 |
| 5,497,338 A | * | 3/1996 | Miyake et al. | 382/232 |
| 5,721,588 A | * | 2/1998 | Fujiwara et al. | 375/240.15 |
| 5,760,835 A | * | 6/1998 | Fujiwara et al. | 375/240.15 |
| 5,768,438 A | * | 6/1998 | Etoh | 382/251 |
| 5,856,848 A | * | 1/1999 | Fujiwara et al. | 375/240.13 |
| 5,859,668 A | * | 1/1999 | Aono et al. | 375/240.15 |
| 6,272,254 B1 | * | 8/2001 | Kaup | 382/236 |

FOREIGN PATENT DOCUMENTS

| EP | 0 624 981 | 11/1994 |
| JP | 2-44883 | 2/1990 |
| JP | 4-56492 | 2/1992 |
| JP | 7-23394 | 1/1995 |
| JP | 7-240923 | 9/1995 |
| JP | 8-70456 | 3/1996 |
| WO | 96/38006 | 11/1996 |

OTHER PUBLICATIONS

IBM Technical Disclosure Bulletin, vol. 34, No. 7B, Dec. 1991, pp. 217–219.
Sun et al., "Motion–Compensated Vector Quantization With A Dynamic Codebook", Proceedings of the international Symposium on circuits and systems, pp. 1003–1006.
Zafar et al., "Predictive Block–Matching Motion Estimation Schemes for Video Compression—Part I Inter–Block Prediction", IEEE Proceedings of the Southeastcon, vol. 2, pp. 1088–1092.
LeGall, "MPEG: A Video Compression Standard fo Multimedia Applications", Communications of the ACM, vol. 34, pp. 47–58.
G. Wallace, "The JPEG Still Picture Compression Standard", Communications of the ACM, vol. 34, pp. 31–44.
Liou, "Overview of the px64 kbit/s Video Coding Standard", Communications of the ACM, vol. 34, pp. 60–63.
Netravali et al., "Motion–Compensated Television Coding: Part I", Bell System Technical Journal, pp. 631–690.
International Organisation for Standardisation Organisation Internationale de Normalisation, pp. 1–3 & pp. 55–59.
Sun et al., "Architectures for MPEG Compressed Bitstream Scaling", pp. 191–199.
Jain, "Image Data Compression: A Review", pp. 349–389.
ITU–T International Telecommunications Union, 1996.

* cited by examiner

*Primary Examiner*—Andrew W. Johns
*Assistant Examiner*—Duy M. Dang
(74) *Attorney, Agent, or Firm*—Schiff Hardin & Waite

(57) ABSTRACT

Image segments are not subjected to any residual error encoding when the coincidence of the encoding information of an image segment to be encoded with encoding information of a predicted image segment determined in the motion estimation is adequately great.

18 Claims, 7 Drawing Sheets

METHOD AND DEVICE FOR CODING A DIGITIZED IMAGE

BACKGROUND OF THE INVENTION

1. Field of the Invention

The present invention is directed to the encoding of a video data stream, particularly of a digitalized image.

2. Description of the Related Art

Greater and greater significance is being accorded to an efficient encoding of digitalized image data (video data stream) in the field of telecommunications technology, specifically in the area of image processing. The encoding of the data should be implemented such that an optimally great compression of the information is achieved given optimally little information loss.

Various methods for encoding a video data stream are known, for example MPEG (Moving Picture coding Experts Group), see the publication by D. Le. Gall, The Video Compression Standard for Multimedia Applications, Communications of the ACM; the publication by H. Sun, Architectures for MPEG Compressed Bitstream Scaling, IEEE Transactions on Circuits and Systems for Video Technology and the publication by A. Jain, Image Data Compression: A Review, Proceedings of the IEEE; JPEG (Joint Photographic Experts Group), see the publication by G. Wallace, The JPEG Still Picture Compression Standard, Communications of the ACM, the standard H. 261, see ITU-T H.261, International Telecommunication Union, standard H.263, see the publication by Ming Liou, Overview of the p×64 kbit/s Video Coding Standard, Communication of the ACM.

These methods, which are referred to as block-based image encoding methods, employed principles of prediction encoding and of transformation encoding and entropy encoding.

In the prediction, encoding method difference images are generated by subtraction of predicted image data from the original image data to be encoded.

What is referred to as a motion-compensated prediction is employed for the prediction. The fundamentals of the motion estimation required for this purpose and their application for motion-compensated prediction are familiar to a person skilled in the art, see the publication by A. N. Netravali und J. D. Robbins, Motion Compensated Television Coding: Part I, Bell System Technical Journal. The motion estimation ensues for an image block to be encoded such that the luminance information (brightness information) that is respectfully allocated to a picture element of the image of the image block to be encoded is compared to luminance information of an area having the same shape in a stored, chronologically preceding image. The comparison usually ensues by forming the absolute differences of the individual luminance values. The comparison ensues for the image block to be encoded to a plurality of areas of the preceding image, these being referred to below as preceding image blocks. The difference images now only contain the difference of the luminance values of the image block and the luminance values of the preceding image block that coincides "best" in the motion estimation.

The topical correlations present in the difference images between neighboring picture elements are utilized with the assistance of a suitable transformation, for example with the assistance of discrete cosign transformation (DCT). The transformation encoding employed supplies transformation encoding coefficients that are subjected to a quantization and to an entropy encoding. Subsequently, the transformation encoding coefficients are transmitted to a receiver, whereby the entire encoding method is implemented in an inverse way. After implementing the decoding, step direct information about the picture elements are again available at the receiver.

Methods for what is referred to as object-based image encoding are known from the publication ISO/IEC JTC1/SC29/WG11, MPEG-4 Video Verification Model Verson 5.0 Doc. In these object-based methods. In these methods, methods for motion estimation and transformation encoding are likewise utilized.

All difference images are always subjected to a transformation encoding in the known methods for image encoding described above. When individual blocks are very similar as a result of the motion estimation, the difference of the image block to be encoded at the corresponding image block of the preceding image yields extremely small values that can be quantized into zero in the quantization of the transformation encoding coefficients under certain circumstances. Previously, however, the differences of the luminance values of the individual image blocks were subjected to a transformation encoding in the known, block-based encoding methods.

SUMMARY OF THE INVENTION

The present invention based on the problem of reducing the outlay for encoding and decoding a video data stream.

The problem is solved with the method for encoding a digitalized image with image segments that include picture elements to which a respective encoding information is allocated, upon employment of a stored, chronologically proceeding image having preceding image segments that have preceding picture elements to which a respectively preceding encoding information is allocated, whereby a preceding image segment is selected depending on a predetermined start vector that indicates a topical shift of the image segment relative to the preceding image segment; whereby an error criterion is formed between encoding information of the image segment and preceding encoding information of the preceding image segment; whereby the error criterion is formed such that the differences of the encoding information of different picture elements are differently weighted; whereby a check is carried out to see whether the error criterion is smaller than a first threshold; whereby, when the error criterion is smaller than the first threshold, the image segment is not subjected to any residual error encoding; whereby, otherwise, the image segment is subjected to the residual error encoding and to an entropy encoding.

The invention also provides an apparatus for encoding a digitized image with image segments that include picture elements to which an encoding information is respectively allocated, upon employment of a stored, chronologically preceding image with preceding image segments that have preceding picture elements to which respectively preceding encoding information is allocated, comprising a, processor unit that is configured such that a preceding image segment is selected proceeding from a predetermined start vector with which a topical shift of the image segment relative to the preceding image segment is indicated; an error criterion between encoding information of the image segment and preceding encoding information of the preceding image segment is formed; a check is carried out to see whether the error criterion is smaller than a first threshold; when the error criterion is smaller then the first threshold, the image segment is not subjected to any residual error encoding; otherwise, the image segment is subjected to the residual error encoding and an entropy encoding.

The method as described above for encoding a digitalized image with image segments that comprise picture elements to which respective encoding information is allocated ensues upon employment of a stored, chronologically preceding image with preceding image segments that comprise preceding picture elements to which a respective preceding encoding information is allocated. A preceding image segment is selected dependent on a start vector that indicates a topical shift of the image segment relative to the preceding image segment. An error criterion between the encoding information of the image segment and the preceding encoding information of the preceding image information is formed and a check is carried out to see whether the error criterion is lower than a first threshold. When the error criterion is lower than the first threshold (S1), the image segment is not subjected to any residual error encoding. Otherwise, the image segment is subjected to a residual error encoding and to an entropy encoding.

What is to be understood by a chronologically preceding image is the preceding, reconstructed image. What is to be understood by a preceding image segment and a preceding picture element are an image segment or, respectively, a picture element of the preceding image.

What is to be understood in the present document by a residual error encoding is an efficient encoding of the difference image information, for example a DCT based transformation encoding, a wavelet transformation encoding, a quad-tree encoding, a fractional encoding, a vector quantization, a difference pulse-code modulation (DPCM), etc.

What is to be understood by encoding information is brightness information (luminance information) or color information (chrominance information) allocated to a picture element.

The apparatus as described above comprises a processor unit that is configured such that the above-described method steps are implemented.

The apparatus can be a standard computer in which the above-described method is stored in the form of a computer program. However, it can also be realized as a specific hardware that is employed for image encoding.

Advantageous developments of the invention are provided by a method whereby the start vector is a zero vector, is a predicted vector that is determined with a prediction for the image segment, or a motion vector that is determined with a motion estimation for the image segment. When the error criterion is smaller then the first threshold, the following steps are implemented: at least one further error criterion is formed for the image segment between the image segment and the preceding image segment; when the second error criterion is smaller then a second threshold, the image segment is not subjected to any residual error encoding; otherwise, the image segment is subjected to the residual error encoding and to an entropy encoding.

In a preferred embodiment, the image segment is subjected to a quantization in the residual error encoding. At least one of the thresholds is adaptively fashioned Alternately, at least one of the thresholds is adaptively fashioned dependent on a quantization parameter. The invention provides that at least one of the following criteria is employed as further error criterion: the difference of the color information of the picture elements of the image segment and the color information of the preceding picture elements of the preceding image segment; the difference of the luminance information of the picture elements of the image segment and the luminance information of the preceding picture elements of the preceding image segment; a topical expanse of the difference of the encoding information of the picture elements of the image segment and the encoding information of the preceding picture elements of the preceding image segment.

The method is further defined whereby, for determining the topical expanse of the difference of the encoding information of the picture elements of the image segment and the encoding information of the preceding picture elements of the preceding image segment, a check is carried out at least once to see whether the difference of the encoding information given a plurality of picture elements as a first plurality is greater then a third threshold; the image segment is subjected to the residual error encoding and to the entropy encoding when the difference of the encoding information in more picture elements then the first plurality is greater then the third threshold.

For determining the topical expanse of the difference of the encoding information, a check is carried out in a plurality of steps to see whether the difference of the encoding information in more picture elements as a respectively further plurality is greater then a respectively further threshold, the image segment is subjected to the residual error encoding and the entropy encoding when the difference of the encoding information in more picture elements then a further plurality is greater then the further threshold. At least one of the pluralities and/or at least one of the thresholds is adaptively fashioned. At least one of the pluralities and/or the third threshold and/or further thresholds are adaptively fashioned dependent on a quantization parameter. The further error criterion is determined such that the differences of the encoding information of different picture elements are differently weighted. The weighting ensues such that differences of encoding information of picture elements that are located in an edge region of a prescribable size of an image segment are weighted higher then differences of encoding information of picture elements outside the edge region.

At least one of the following criteria can be employed as a further error criterion:

the difference of the color information of the picture elements of the image segment and the color information of the preceding picture elements of the preceding image segment;

the difference of the luminance information of the picture elements of the image segment and the luminance information of the preceding picture elements of the preceding image segments;

a topical expanse of the difference of the encoding information of the picture elements of the image segment and the encoding information of the preceding picture elements of the preceding image segment.

These criteria for forming the second error criterion correspond to different tests in view of different artifact types that arise due to the known image encoding methods.

By taking the color information or, respectively, luminance information into consideration in the comparison of the image segments, the comparison is expanded by a further criterion and, thus, the result of the comparison is improved.

For simplifying the method and, thus, for reducing the calculating capacity required for the implementation of the method, it is also advantageous in a development to check at least once for determining the topical expanse of the difference as to whether the difference of the encoding information given a plurality of picture elements as a first plurality is greater than a third threshold T1. The image segment is subjected to the residual error encoding and to the entropy encoding when the difference of the encoding information given a plurality of picture elements as the first plurality is higher than the third threshold.

A check can also be carried out in a plurality of steps as to whether the difference of the encoding information given a plurality of picture elements as a respectively further plurality is greater than a respectively further threshold.

It is advantageous for improving the image quality to fashion at least one of the pluralities and/or of the thresholds adaptively, preferably dependent on a quantization parameter. What is thus achieved is that, given a rougher quantization, a higher plurality of picture segments likewise need not be subjected to a motion estimation, a residual error encoding and an entropy encoding and, thus, further calculating capacity for the implementation of the method is reduced.

Another improvement of the results that are achieved is achieved in a development in that the error criterion is determined such that the differences of the encoding information of various picture elements are differently weighted.

Since artifacts often appear in an edge region of an image segment, it has proven advantageous to implement the weighting such that differences between picture elements that are located in an edge region of prescribable size in an image segment are weighted higher than differences of picture elements outside the edge region.

Even though the invention in the exemplary embodiments is described below on the basis of a block-based image encoding method, it can also be advantageously utilized without further ado in object-based image encoding methods.

What is understood below by an image segment is a quantity of picture elements of an arbitrary shape that are grouped together. In block-based image encoding methods, the image segments comprise a rectangular shape, for example a quadratic shape given the method according to the MPEG 2 standard, that respectively contain 8×8 picture elements (image block) or 16×16 picture elements (macro-block). In block-based image encoding methods, the image segments are referred to as image blocks.

BRIEF DESCRIPTION OF THE DRAWINGS

Preferred exemplary embodiments of the invention are described in greater detail below with reference to Figures.

DETAILED DESCRIPTION OF THE PREFERRED EMBODIMENTS

Figure 2:
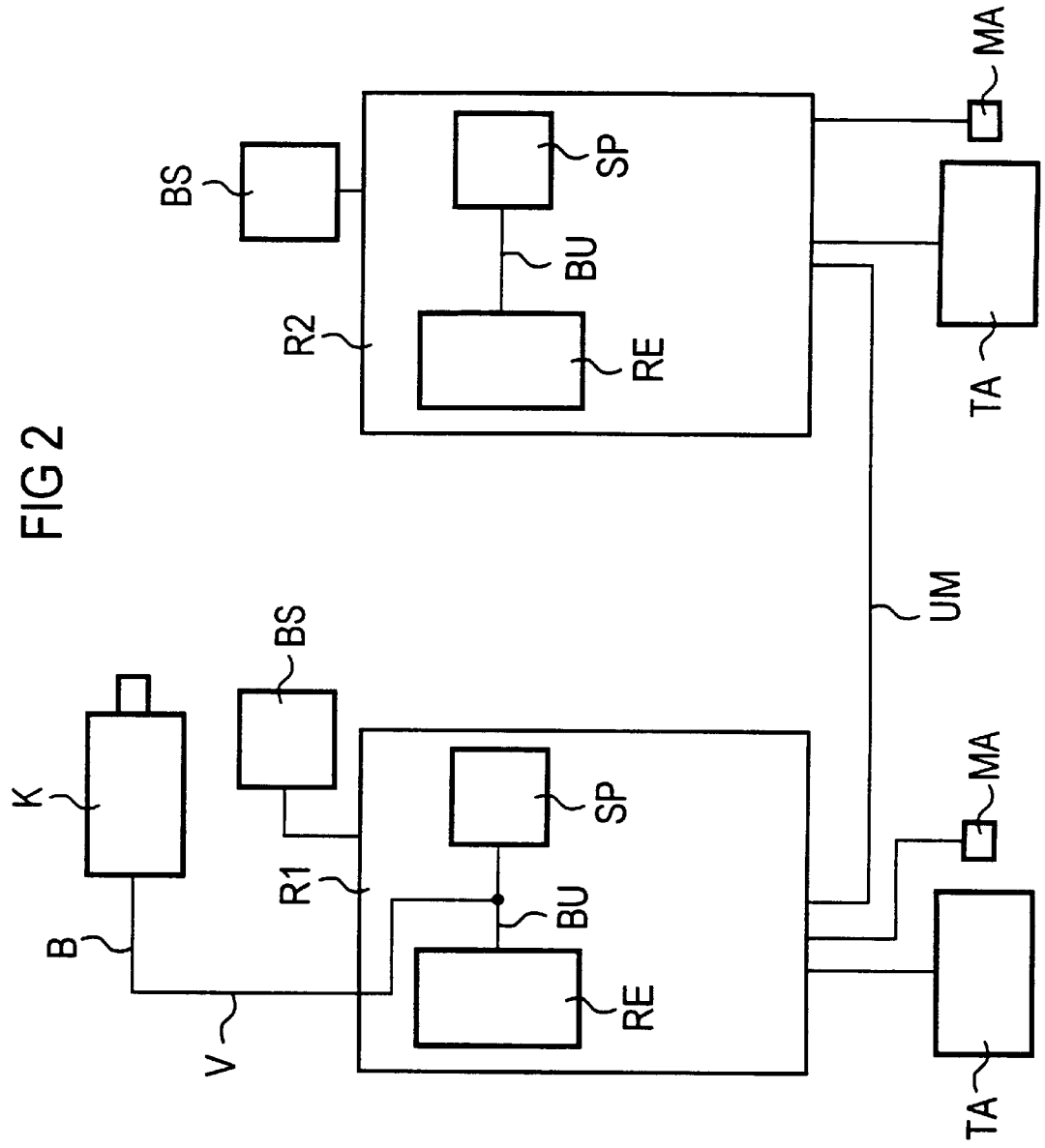
FIG. 2 is a sketch of a computer arrangement having two computers, a camera and a transmission medium for the registration, encoding, transmission and decoding of image data.

FIG. 2 shows a camera K with which a sequence of images B is registered and is supplied to a first computer R1 via a connection V.

In the first computer R1, the images of the sequence of images B are digitized and encoded according to the MPEG2 method described in the publication by D. Le Gall, The Video Compression Standard for Multimedia Applications, Communications of the ACM.

The first computer R1 is connected to a second computer R2 via a transmission medium UM, for example a cable or a radio transmission link. The image data encoded by the first computer R1 is transmitted to the second computer R2 via the transmission medium UM and are decoded by the second computer.

The first computer R1 and the second computer R2 each respectively comprise a memory SP and a processor unit RE that are connected to one another via a bus BU. The processor unit RE of the first computer R1 is fashioned such that the method steps explained later for encoding the digitalized images are implemented. The processor unit RE of the second computer R2 is fashioned such that the received, encoded data are decoded according to the MPEG2 method. The first computer R1 and the second computer R2 further respectively comprise a picture screen BS for displaying the images B as well as a keyboard TA and a mouse MA for controlling the computers R1 and R2.

Figure 3:
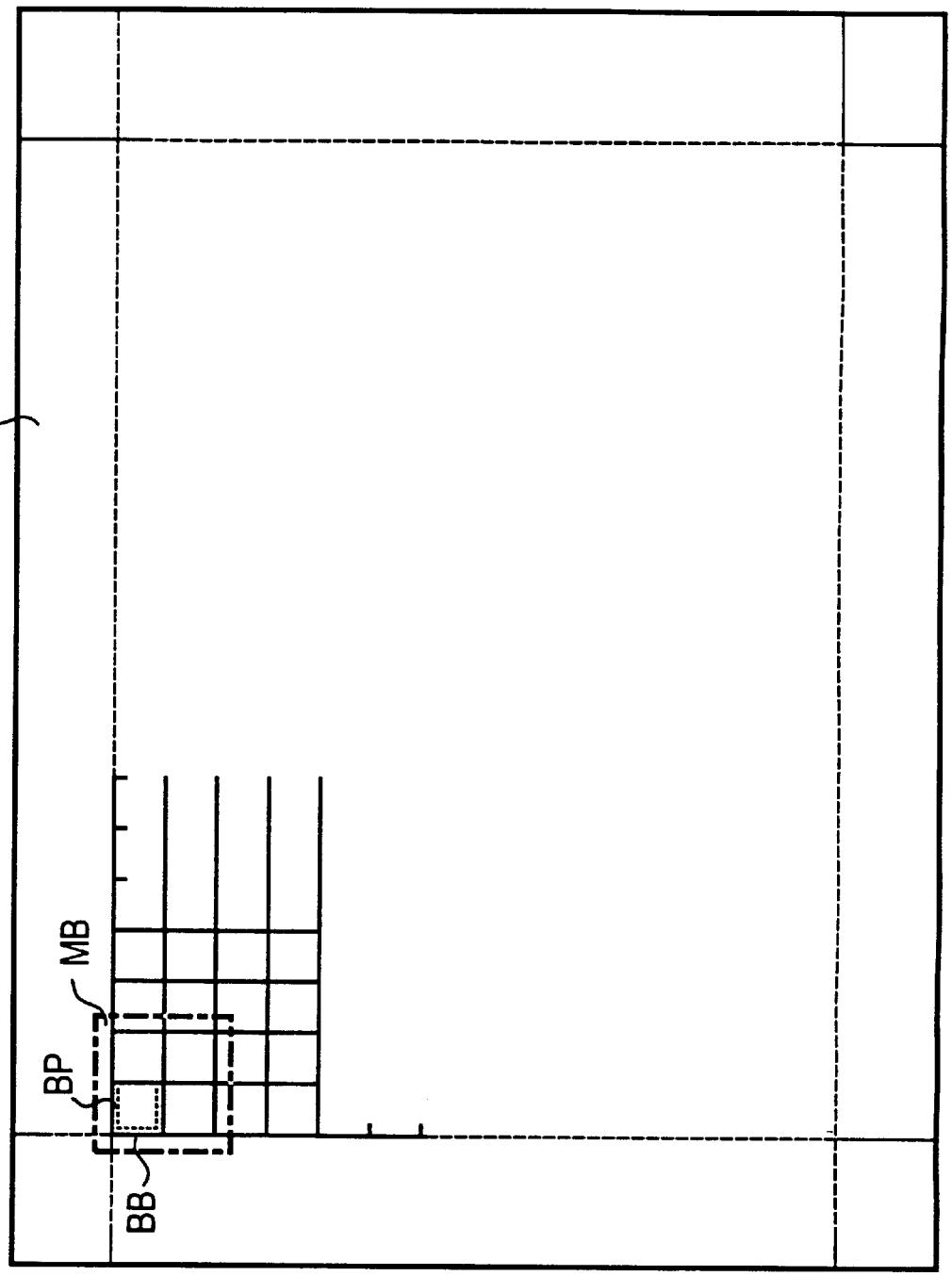
FIG. 3 is a sketch of an image having picture elements that are grouped in image blocks.

In all embodiments the images B are digitalized in the first computer R1. The digitalized images B comprise picture elements BP (see FIG. 3) to which luminance information (brightness information) and/or color information (chrominance information) is allocated.

The picture elements BP are grouped into image blocks BB. Given the method according to the MPEG2 standard, four neighboring image blocks BB having picture elements BP to which luminance information is allocated and two image blocks BB having chrominance information are grouped to form a macro-block MB.

Figure 4:
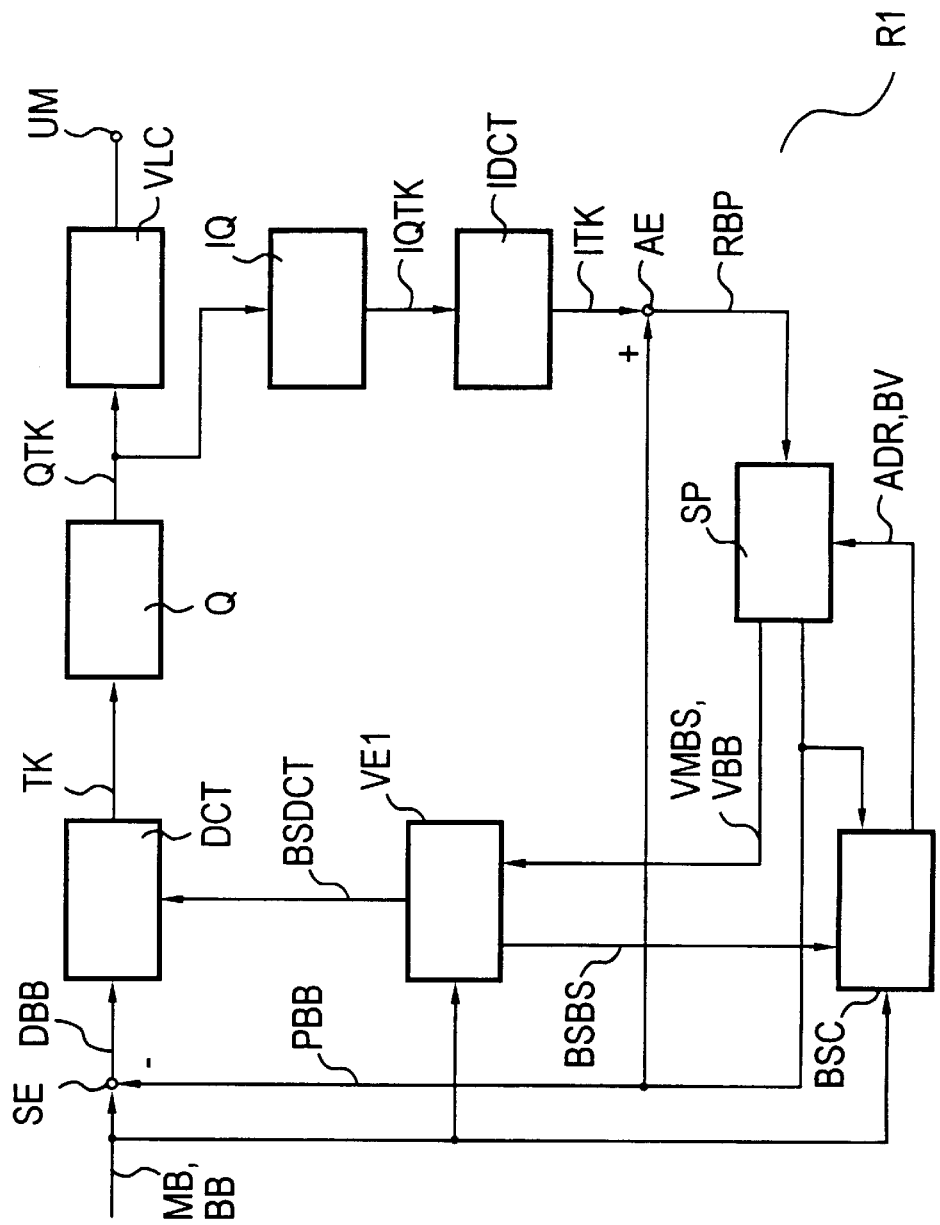
FIG. 4 is a symbolic sketch of the apparatus for encoding, with reference whereto a first exemplary embodiment and a second exemplary embodiment of the invention are explained.

The underlying method steps for encoding the image B are also shared by all exemplary embodiments. They are explained on the basis of a symbolic sketch of the apparatus for encoding (see FIGS. 4 and 5).

A respective image block BB is supplied to a subtraction unit SE. Encoding information of picture elements of a predicted image block PBB (explained later) is subtracted from the encoding information of the picture elements BP of the image block BB in the subtraction unit SE.

A difference image block DBB deriving by the difference formation is supplied to a unit for transformation encoding DCT in which a discrete cosine transformation (DCT) for forming transformation coefficients TK is applied to the difference image block DBB. The transformation coefficients TK are quantized QTK in a quantization unit Q. The quantized transformation coefficients QTK are supplied to a unit for entropy encoding VLC in which what is referred to as a run length encoding and/or what is referred to as a variable length encoding is implemented.

In the encoding, the quantized transformation coefficients QTK are also supplied to a unit for inverse quantizing IQ in which inversely quantized transformation coefficients IQTK are formed.

In a unit for inverse transformation encoding IDCT, the inversely quantized transformation coefficients IQTK supplied to the unit are inversely transformed. Inverse transformation coefficients ITK result which are supplied to an addition unit AE derive.

The addition unit AE is also supplied with the predicted image block PBB. The predicted image block PBB contains predicted encoding information that are added to the inverse transformation coefficients ITK. Reconstructed picture elements RBP deriving the predicted image form the reconstructed image and are stored in a memory SP.

At least one chronologically preceding, reconstructed image is respectively stored in the memory SP. The preceding image comprises preceding image blocks having reconstructed picture elements RBP that represent preceding encoding information of preceding picture elements BP of the preceding image.

The image stored in the memory SP is employed for a motion estimation that is implemented in a unit for motion estimation BSC.

The motion estimation BSC ensues such that a comparison of the encoding information for the picture elements BP of a respective macro-block MB and/or of an image block BB to encoding information of the picture elements BP of the preceding image is implemented. In the preceding image, preceding picture elements are employed that are grouped in a preceding image block VBB or, respectively, preceding macro-block VMB.

A sum of absolute differences of the encoding information of the picture elements BP that are contained in the image block BB or, respectively, in the macro-block MB with encoding information of picture elements of a region in the preceding image that exhibits the same shape as the image block BB or, respectively, the macro-block MB is formed for the image block BB or, respectively, the macro-block MB. The sum of absolute differences is referred to below as error criterion.

The method for simpler presentation for a macro-block MB (16×16 pictures element BP) is explained below. The steps are to be correspondingly implemented for an image block BB but with 8×8 picture elements BP in the image block BB.

The error criterion for a macro-block MB is formed according to the following rule:

$$F = \sum_{i=1}^{16} \sum_{j=1}^{16} |x_{ij} - y_{ij}|, \quad (1)$$

whereby i indicates a line index for unambiguous identification of a line with a macro-block MB, j references a column index for unambiguous identification of a column within the macro-block MB, $x_{ij}$ references a value of the encoding information that is allocated to a picture element BP within the macro-block MB located at the position indicated by i, j, $y_{ij}$ references a value of the encoding information that is allocated to a preceding picture element BP within the region of the preceding image located at the position indicated by i, j, this being compared to the macro-block MB.

The error criterion is formed for a prescribable plurality of regions within the preceding image, what is referred to as the search area.

As a result of the motion estimation BSC, the region of the preceding image B is selected as predicted image block PBB for which the error criterion is minimal, since the coincidence with the image block BB is optimum for this region.

Further, the topical shift of the image block BB relative to the predicted image block PBB in the preceding image is identified within the framework of the motion estimation. The shift is referred to below as a motion vector BV.

An ADR is supplied to the memory SP in the framework of the motion estimation BSC for the respectively unambiguous addressing of the region of the preceding image.

The encoding information of the picture elements of the predicted image block PBB is supplied to the subtraction unit SE and is subtracted from the encoding information of the picture elements BP of the macro-block MB or, respectively, of the image block BP.

I. First Exemplary Embodiment

Figure 6:
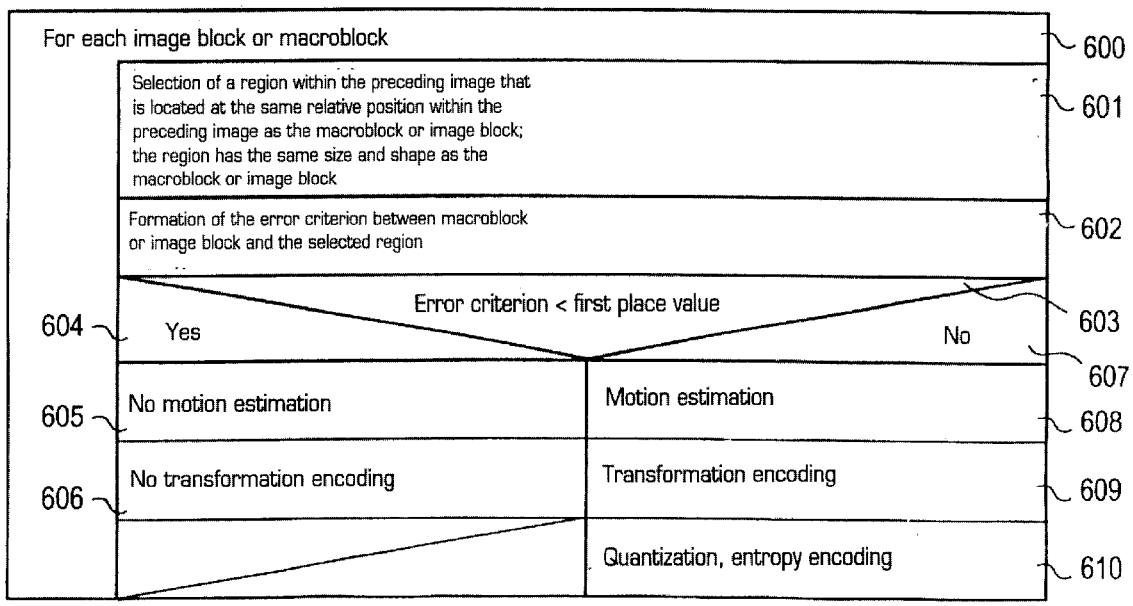
FIG. 6 is a flow chart in which the individual method steps of the first exemplary embodiment are shown.

In the first exemplary embodiment, the method steps thereof being shown in FIG. 6, the above-described method is implemented with the following expansions.

For every macro-block MB or, respectively, every image block BB (600), a region is selected in the stored, preceding image (Step 601) that is located at the relatively same position within the preceding image as the macro-block MB or, respectively, the image block BB within the digitalized image B. This means that a selected start vector with which a topical shift of the image segment for the region is indicated is a zero vector.

The selected region has the same shape and size as the macro-block MB (16×16 picture elements) or, respectively, the image block BB (8×8 picture elements). The selected region is referred to below as a preceding macro-block VMB or, respectively, as preceding image block VBB.

The preceding macro-block VMB or, respectively, the preceding image block VBB and the macro-block MB or, respectively, the image block BB are supplied to a first comparison unit VE1 (see FIG. 4) in which the above-described error criterion F is formed (Step 602).

A check is carried out in a third Step 603 to see whether the error criterion F is smaller then a prescribable, first threshold S1 (F<S1?).

When the error criterion F is smaller then the first threshold S1 (604), then a signal BSBS is formed by the first comparison unit VE1 and is supplied to the unit for motion estimation BSC, this indicating that no motion estimation is implemented for the macro-block MB or, respectively, the image block BB. Further, the first comparison unit VE1 forms a further signal BSDCT and supplies this through the unit for transformation encoding DCT, this indicating that no transformation encoding DCT is implemented for the macro-block MB or, respectively, the image block BB. In other words, this case means that, given an adequately good coincidence between the macro-block MB or, respectively, the image block BB and the preceding macro-block VMB or, respectively, the preceding image VBB, no estimation BSC (605) and no transformation encoding DCT (606) ensues.

When the error criterion F is not smaller then the first threshold S1 (607), then the aforementioned motion estimation BSC (608) and transformation encoding DCT (609), quantization and entropy encoding (610) are implemented.

A considerable saving of required calculating time for encoding is achieved on the basis of this procedure.

Second Exemplary Embodiment

Figure 7:
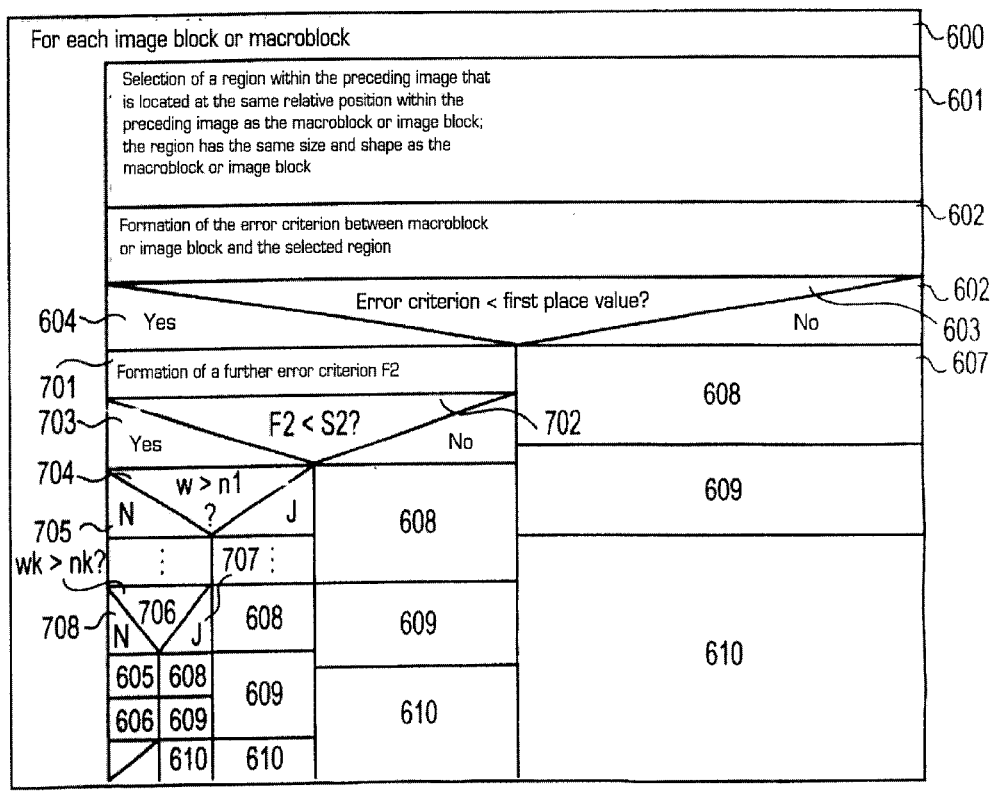
FIG. 7 is a flow chart in which the individual method steps of the second exemplary embodiment are shown.

The second exemplary embodiment, whose steps are shown in FIG. 7, differs from the first exemplary embodiment only in terms of a few additional steps.

For each macro-block MB or, respectively, each image block BB (600), a region in the stored, preceding image is likewise selected (Step 601) that is located at the relatively same position within the preceding image as the macro-block MB or, respectively, the image block BB within the digitalized image B. The selected region comprises the same shape and size as the macro-block MB (16×16 picture elements) or, respectively, the image block BB (8×8 picture elements). The selected region is referred to below as, the preceding macro-block VMB or, respectively, as the preceding image block VBB.

The preceding macro-block VMB or, respectively, the preceding image block VBB and the macro-block MB or, respectively, the image block BB are supplied to the first comparison unit VE1 (see FIG. 4) wherein the above-described error criterion F is formed (Step 602).

A check is carried out in a third Step 603 to see whether the error criterion F is smaller then a prescribable, first threshold S1 (F<S1?).

When the error criterion F is smaller then the first threshold S1 (604), then the following, further steps are implemented.

At least one further error criterion F2 is formed in the first comparison unit VE1 for the macro-block MB or, respectively, the image block BB (Step 701).

The at least one further error criterion F2 graphically describes the deviation of the macro-block MB or, respectively, of the image block BB from the preceding macro-block VMB or, respectively, the preceding image block VBB in view of various aspects that can lead to further artifacts in the decoding of the encoded image.

The coincidence of the respectively other encoding information of the picture elements BP of the macro-block MB or, respectively, image block BB with the color values of the picture elements BP of the preceding macro-block MB or, respectively, of the preceding image BB is employed as a further error criterion. For that case wherein the formation of the error criterion F uses luminance information, chrominance information is employed for the formation of the further error criterion F2 and vice versa.

The formation of the further error criterion in turn ensues by forming the sum of the absolute values of the differences of the encoding information.

When the second error criterion is smaller then a prescribable, second threshold (Step 702, 703), then a further check is carried out to see whether the difference of the encoding information (luminance information and/or color information) given a plurality of picture elements as a first plurality n1 is smaller then a third threshold T1 (Step 704). In other words, this means that the number w of those picture elements is identified wherein the encoding information is greater then the third threshold T1. When the number is greater then the first plurality n1, then the macro-block MB or, respectively, image block BB must be encoded.

When this is not the case (Step 705), then a check is also made in a prescribable plurality of further check steps (706) to see whether the difference of the encoding information given a plurality of picture elements as respectively further plurality nk (k=2 . . . m, m∈N+\{1}) is greater than a respective, further threshold Tk. (nk+1<nk) and (Tk+1>Tk) respectively applies.

The macro-block MB or, respectively, image block is always encoded or, respectively, a motion estimation for the macro-block MB or, respectively, image block BB is implemented when the number wk of picture elements wherein the encoding information is greater than the further threshold Tk is greater then the further plurality nk (707).

When, however, the plurality wk of picture elements wherein the encoding information is greater than the further threshold Tk is not greater than the further plurality nk (708), then the first comparison unit VE1 forms the signal BSBS and supplies to the unit for motion estimation BSC, this indicating that no motion estimation is implemented for the macro-block MB or, respectively, the image block BB. Further, the first comparison unit VE1 forms the further signal BSDCT and supplies it to the unit for transformation encoding DCT, this indicating that no transformation encoding DCT is implemented for the macro-block MB or, respectively, the image block BB. In other words, this case means that, given adequately good coincidence between the macro-block MB or, respectively, the image block BB and the preceding macro-block VMB or, respectively, the preceding image block VBB, no motion estimation BSC(605) and no transformation encoding DCT (606) ensues.

For all other cases, the aforementioned motion estimation BSC (608) and transformation encoding DCT (609), quantization and entropy encoding (610) is implemented.

Third Exemplary Embodiment

Figure 1:
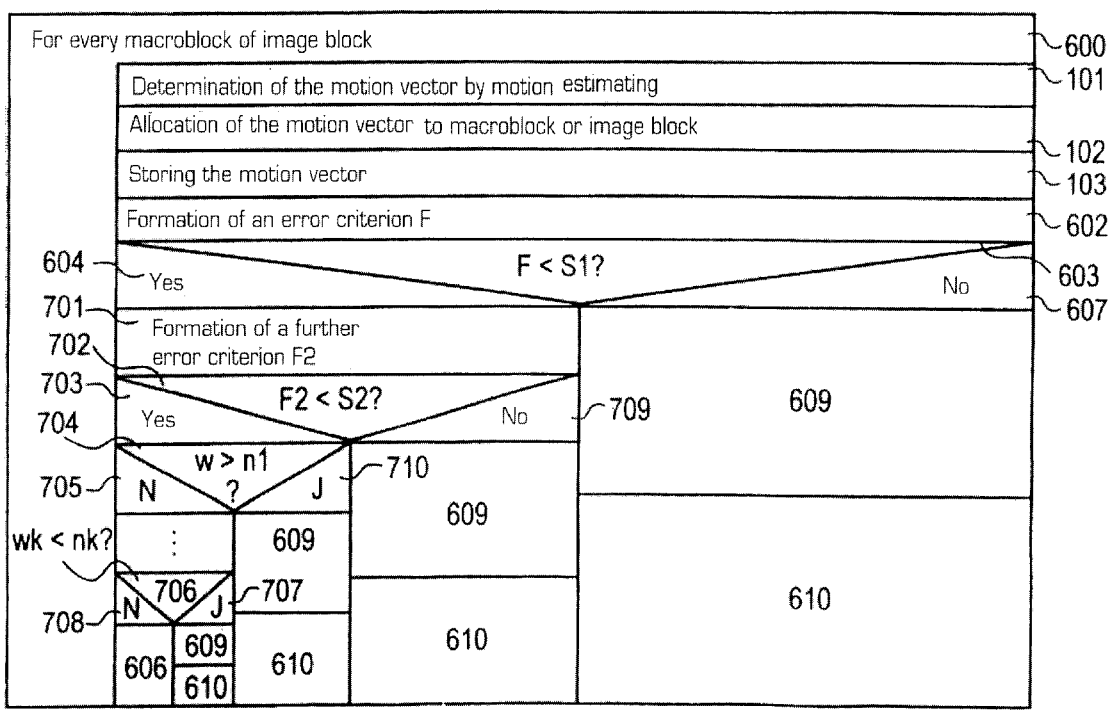
FIG. 1 is a flow chart in which the individual method steps of the third exemplary embodiment are shown.
Figure 5:
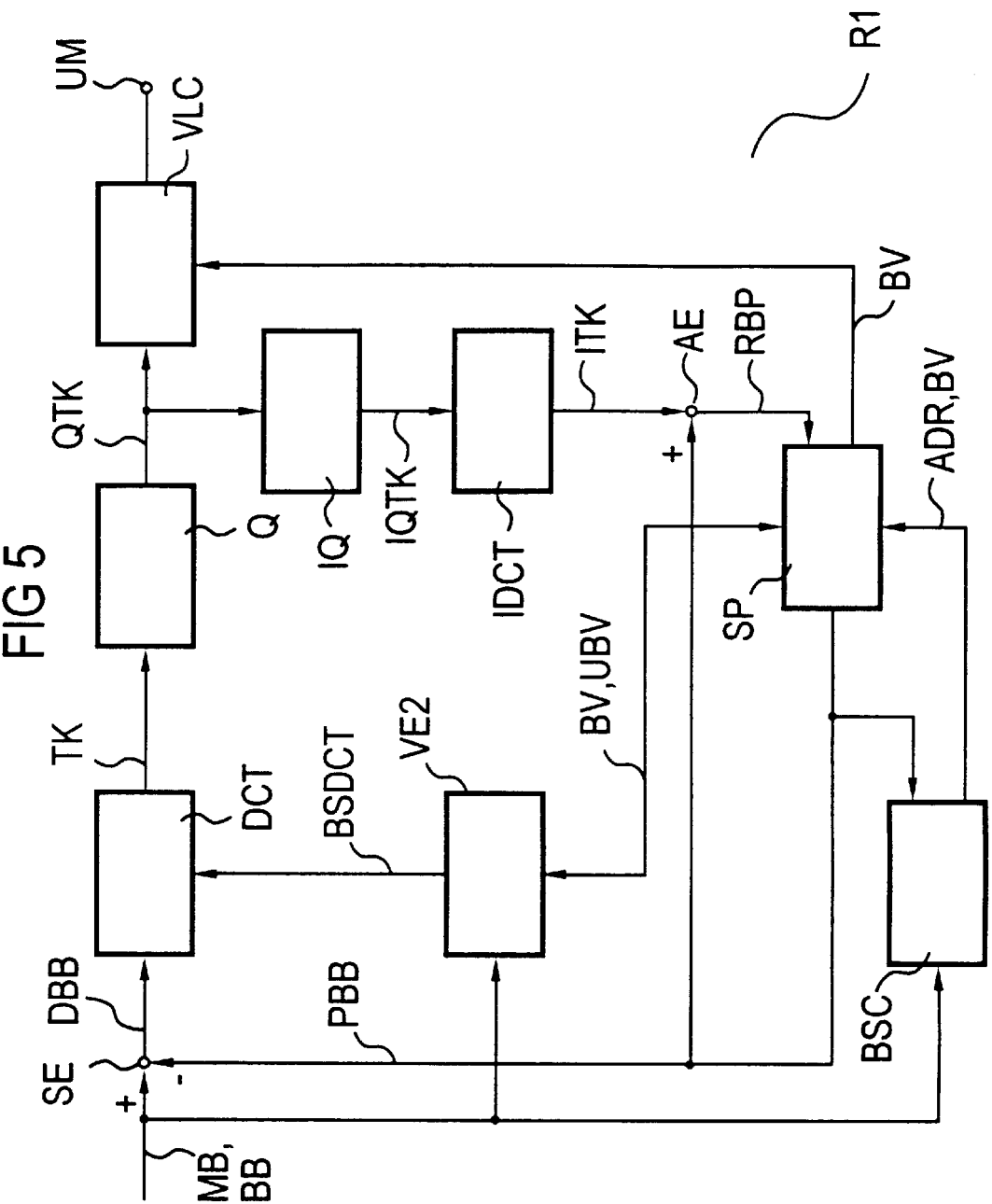
FIG. 5 is a symbolic sketch of the apparatus for encoding with reference whereto a third exemplary embodiment of the invention is explained.

In the third exemplary embodiment, that is shown in FIG. 5 or, respectively, whose execution is shown in FIG. 1, a motion estimation BSC for determining a motion vector BV is implemented (Step 101) for each macro-block MB or, respectively, image block BB. The motion vector BV is allocated to the macro-block MB or, respectively, the image block BB (Step 102) and is stored (Step 103) in the memory SP.

FIG. 5 shows a second comparison unit VE2 that is configured such that the following method steps are implemented.

The macro-block MB or, respectively, image block BB as well as the preceding macro-block VMB or, respectively, the preceding image block VBB are supplied to the second comparison unit VE2.

At least the error criterion F is formed in the second comparison unit VE2 for the macro-block MB or, respectively, the image block BB (Step 701).

Further, the further criterion F2 is formed for the macro-block MB or, respectively, the image block VB.

The coincidence of the encoding information of the picture elements BP of the macro-block MB or, respectively, image block BB with the coding information of the picture elements BP of the preceding macro-block MB or, respectively, preceding image block BB is employed as a further error criterion F2. This ensues by forming the sum of the absolute values of the differences of the color values.

When the further error criterion F2 is smaller than a prescribable, second threshold S2 (702, 703), then a check is also carried out to see whether the difference of the encoding information (luminance information and/or color information) given a plurality of picture elements as a first plurality n1 is greater than a third threshold T1 (Step 704). In other words, this means,that the plurality w of the picture elements is identified wherein the encoding information is greater than the third threshold T1. When the plurality is greater than the first plurality n1, then the macro-block MB or, respectively, the image block BB must be encoded.

When this is not the case (Step 705), then a further check is carried out in a prescribable plurality of further check steps (706) to see whether the difference of the encoding information given a plurality of picture elements as a respectively further plurality nk (k=1 . . . m, m∈N+/{1}) is greater than a respectively further threshold Tk. The relations (nk+1<nk) and (Tk+1>Tk) respectively apply.

The macro-block MB or, respectively, image block BB is always encoded when the plurality wk of the picture elements wherein the encoding information is greater than the further threshold Tk is greater than the further plurality nk (707).

When, however, the plurality wk of picture elements wherein the encoding information is greater than the further threshold Tk is not greater than the further plurality nk (708), then the second comparison unit VE2 forms the further signal BSDCT and supplies it to the unit for transformation encoding DCT, this indicating that no transformation encoding DCT is implemented for the macro-block MB or, respectively, the image block BB.

In other words, this case means that, given an adequately good coincidence between the macro-block MB or, respectively, the image block BB and the preceding macro-block VMB or, respectively, the preceding image block VBB, no transformation encoding DCT (606) ensues. Only the motion vector BEV itself is supplied to the unit for entropy encoding VLC and is entropy-encoded. In this case, the second comparison unit VE2 forms the further signal BSDCT and supplies it to the unit for transformation encoding DCT, this indicating that no transformation encoding DCT is implemented for the macro-block MB or, respectively, the image block BB.

For all other cases (709, 710), the aforementioned transformation encoding DCT (609), quantization and entropy encoding (610) is implemented for the macro-block MB or, respectively, the image block BB.

A few alternatives for the above-described exemplary embodiments are disclosed below.

Within the scope of the invention, any block-based image encoding method can be utilized that employs a motion estimation and a transformation encoding, for example, MPEG1, the method according to the H.261 standard or the method according to the H.263 standard.

The method, further, can also be advantageously applied without further ado given object-based image encoding methods, whereby the image segments comprise an arbitrary shape in this case. The error criterion can also be formed in some other way, for example, by forming the sum of an arbitrary norm of the difference of the luminance values.

All thresholds and/or plurality nk can be adaptively fashioned. It is advantageous to adaptively fashion the thresholds dependent on a quantization parameter with which the quantization is characterized.

It has proven advantageous for the formation of the error criterion F or, respectively, of the further error criterion F2 to weight differences of picture elements in an edge region of the macro-block MB or, respectively, of the image block BB higher than differences of picture elements outside the edge region.

The error criterion F or, respectively, further error criterion F2 generally derives according to the following rule:

$$F, F2 = \sum_{i=1}^{16} \sum_{j=1}^{16} |x_{ij} - y_{ij}| \cdot \alpha_{ij}$$

whereby $\alpha_{ij}$ indicates elements of a weighting matrix $(\alpha_{ij})$.

The following structure shown by way of example has proven advantageous for the weighting matrix $(\alpha_{ij})$:

$$(\alpha_{ij}) = \begin{vmatrix} \alpha_{1,1} & \alpha_{1,2} & \alpha_{1,3} & \alpha_{1,4} & \cdots & \alpha_{1,13} & \alpha_{1,14} & \alpha_{1,15} & \alpha_{1,16} \\ \alpha_{2,1} & \alpha_{2,2} & \alpha_{2,3} & \alpha_{2,4} & \cdots & \alpha_{2,13} & \alpha_{2,14} & \alpha_{2,15} & \alpha_{2,16} \\ \alpha_{3,1} & \alpha_{3,2} & \alpha_{3,3} & \alpha_{3,4} & \cdots & \alpha_{3,13} & \alpha_{3,14} & \alpha_{3,15} & \alpha_{3,16} \\ \alpha_{4,1} & \alpha_{4,2} & \alpha_{4,3} & \alpha_{4,4} & \cdots & \alpha_{4,13} & \alpha_{4,14} & \alpha_{4,15} & \alpha_{4,16} \\ \vdots & \vdots & \vdots & \vdots & \ddots & \vdots & \vdots & \vdots & \vdots \\ \alpha_{13,1} & \alpha_{13,2} & \alpha_{13,3} & \alpha_{13,4} & \cdots & \alpha_{13,13} & \alpha_{13,14} & \alpha_{13,15} & \alpha_{13,16} \\ \alpha_{14,1} & \alpha_{14,2} & \alpha_{14,3} & \alpha_{14,4} & \vdots & \alpha_{14,13} & \alpha_{14,14} & \alpha_{14,15} & \alpha_{14,16} \\ \alpha_{15,1} & \alpha_{15,2} & \alpha_{15,3} & \alpha_{15,4} & \cdots & \alpha_{15,13} & \alpha_{15,14} & \alpha_{15,15} & \alpha_{15,16} \\ \alpha_{16,1} & \alpha_{16,2} & \alpha_{16,3} & \alpha_{16,4} & \cdots & \alpha_{16,13} & \alpha_{16,14} & \alpha_{16,15} & \alpha_{16,16} \end{vmatrix}$$

It has proven advantageous to allocate higher values to those $\alpha_{ij}$ that are located in the proximity of the edge of the weighting matrix $(\alpha_{ij})$ then to those that are located in the center of the weighting matrix $\alpha_{ij}$.

The value 10 for the edge region and the value 1 for the center have proven advantageous.

The following structure thus derives for the weighting matrix $(\alpha_{ij})$:

$$(\alpha_{ij}) = \begin{vmatrix} 10 & 10 & 10 & 10 & \cdots & 10 & 10 & 10 & 10 \\ 10 & 10 & 10 & 10 & \cdots & 10 & 10 & 10 & 10 \\ 10 & 10 & 10 & 1 & \cdots & 1 & 10 & 10 & 10 \\ 10 & 10 & 1 & 1 & \cdots & 1 & 1 & 10 & 10 \\ \vdots & \vdots & \vdots & \vdots & \ddots & \vdots & \vdots & \vdots & \vdots \\ 10 & 10 & 1 & 1 & \cdots & 1 & 1 & 10 & 10 \\ 10 & 10 & 10 & 1 & \cdots & 1 & 10 & 10 & 10 \\ 10 & 10 & 10 & 10 & \cdots & 10 & 10 & 10 & 10 \\ 10 & 10 & 10 & 10 & \cdots & 10 & 10 & 10 & 10 \end{vmatrix}$$

The size of the edge region has proven adequate with respectively two columns or respectively, rows at the edge of the macro-block MB or, respectively, image block BB.

Further, a predicted vector determined by the prediction can be employed as well as start vector.

Although other modifications and changes may be suggested by those skilled in the art, it is the intention of the inventors to embody within the patent warranted hereon, all changes and modifications as reasonably and properly come within the scope of their contribution to the art.

The following publications were cited in the framework of this document:

[1] D. Le. Gall, The Video Compression Standard for Multimedia Applications, Communications of the ACM, Vol. 34, No. 4, pp. 47–58, April 1991, 1991).

[2] G. Wallace, The JPEG Still Picture Compression Standard, Communications of the ACM, Vol. 34, No. 4, pp. 3144, April 1991

[3] ITU-T H.261, International Telecommunication Union, 1996

[4] Ming Liou, Overview of the px64 kbit/s Video Coding Standard, Communications of the ACM, Vol. 34, No. 4, pp. 60–63, April 1991

[5] A. N. Netravali und J. D. Robbins, Motion Compensated Television Coding: Part I, Bell System Technical Journal, Vol. 58, pp. 631–690, March 1979)

[6] ISO/IEC JTC1/SC29/WG11, MPEG-4 Video Verification Model Version 5.0 Doc. 1469, pp. 55–59, November 1996

[7] H. Sun, Architectures for MPEG Compressed Bitstream Scaling, IEEE Transactions on Circuits and Systems for Video Technology Vol. 6, No. 2, pp. 191–199, April 1996

[8] A. Jain, Image Data Compression: A Review, Proceedings of the IEEE, Vol. 69, No. 3, pp. 349–389, March 1981

We claim:

1. A method for encoding a digitalized image with image segments that include picture elements to which a respective encoding information is allocated, upon employment of a stored, chronologically proceeding image having preceding image segments that have preceding picture elements to which a respectively preceding encoding information is allocated, comprising the steps of:

selecting a preceding image segment dependent on a predetermined start vector that indicates a topical shift of an image segment relative to the preceding image segment;

forming an error criterion between encoding information of the image segment and preceding encoding information of the preceding image segment;

forming the error criterion such that differences of the encoding information of different picture elements are differently weighted;

carrying out a check to see whether the error criterion is smaller than a threshold;

when the error criterion is smaller than the threshold, avoiding subjecting the image segment to any residual error encoding;

subjecting the image segment to the residual error encoding and to an entropy encoding when the error criterion is not smaller than the threshold;

wherein said threshold is a first threshold, and wherein when the error criterion is smaller than the first threshold, the following steps are implemented:

forming at least one further error criterion for an image segment between the image segment and the preceding image segment;

when the second error criterion is smaller than a second threshold, avoiding subjecting the image segment to any residual error encoding; and subjecting the image segment to the residual error encoding and to an entropy encoding if the second error criterion is not smaller than the second threshold.

2. A method according to claim 1, further comprising the step of:

using at least one of the following criteria as a further error criterion:

a difference of color information of the picture elements of the image segment and color information of the preceding picture elements of the preceding image segment;

a difference of luminance information of the picture elements of the image segment and luminance information of the preceding picture elements of the preceding image segment;

a topical expanse of a difference of encoding information of the picture elements of the image segment and encoding information of the preceding picture elements of the preceding image segment.

3. A method according to claim 2, further comprising the steps of:

for determining a topical expanse of the difference of the encoding information of the picture elements of the image segment and the encoding information of the preceding picture elements of the preceding image segment, performing a check at least once to see whether the difference of the encoding information given a plurality of picture elements as a first plurality is greater then a third threshold;

subjecting the image segment to the residual error encoding and to the entropy encoding when the difference of the encoding information in more picture elements than the first plurality is greater than the third threshold.

4. A method according to claim 3, further comprising the steps of:

for determining the topical expanse of the difference of the encoding information, performing a check in a plurality of steps to see whether the difference of the encoding information in more picture elements as a further plurality is greater than a further threshold, subjecting the image segment to the residual error encoding and the entropy encoding when the difference of the encoding information in more picture elements than the further plurality is greater than the further threshold.

5. A method according to claim 3, wherein at least one of the pluralities is adaptive.

6. A method according to claim 3, wherein at least one of the pluralities is adaptive depending on a quantization parameter.

7. A method according to claim 3, wherein at least one of the thresholds is adaptive.

8. A method according to claim 3, wherein third threshold is adaptive depending on a quantization parameter.

9. A method according to claim 3, wherein the further thresholds are adaptive depending on a quantiztion parameter.

10. A method according to claim 2, further comprising the step of:

determining the further error criterion such that the differences of the encoding information of different picture elements are differently weighted.

11. A method for encoding a digitized image with image segments that include picture elements to which a respective encoding information is allocated, upon employment of a stored, chronologically proceeding image having preceding image segments that have preceding picture elements to which a respectively preceding encoding information is allocated, comprising the steps of:

selecting a preceding image segment dependent on a predetermined start vector that indicates a topical shift of an image segment relative to the preceding image segment;

forming an error criterion between encoding information of the image segment and preceding encoding information of the preceding image segment;

forming the error criterion such that differences of the encoding information of different picture elements are different weighted;

carrying out a check to see whether the error criterion is smaller than a threshold;

when the error criterion is smaller than the threshold, avoiding subjecting the image segment to any residual error encoding;

subjecting the image segment to the residual error encoding and to an entropy encoding when the error criterion is not smaller than the threshold; and weighting the differences of encoding information of picture elements that are located in an edge region of a prescribable size of an image segment higher than differences of encoding information of picture elements outsides the edge region.

12. An apparatus for encoding a digitized image with image segments that include picture elements to which an encoding information is allocated, upon employment of a stored, chronologically preceding image with preceding image segments that have preceding picture elements to which preceding encoding information is allocated, comprising:

a processor unit that is configured such that:
- a preceding image segment is selected proceeding from a predetermined start vector with which a topical shift of the image segment relative to the preceding image segment is indicated;
- an error criterion between encoding information of the image segment and preceding encoding information of the preceding image segment is formed;
- a check is carried out to see whether the error criterion is smaller than a first threshold;
- when the error criterion is smaller than the first threshold, the image segment is not subjected to any residual error encoding;
- otherwise, the image segment is subjected to the residual error encoding and an entropy encoding;
- when the error criterion is smaller than the first threshold, the following steps are implemented;
  - at least one further error criterion between the image segment and the preceding image segment is formed for the image segment;
  - when the second error criterion is smaller than a second threshold, the image segment is not subjected to any residual error encoding;
  - otherwise, the image segment is subjected to the residual error encoding and to an entropy encoding.

13. An apparatus according to claim 12, wherein the processor unit is configured such that at least one of the following criteria is employed as a further error criterion:
- a difference of color information of the picture elements of the image segment and color information of the preceding picture elements of the preceding image segment;
- a difference of luminance information of the picture elements of the image segment and luminance information of the preceding picture elements of the preceding image segment;
- a topical expanse of a difference of the encoding information of the picture elements of the image segment and the encoding information of the preceding picture elements of the preceding image segment.

14. An apparatus according to claim 13, wherein the processor unit is configured such that for determining the topical expanse of the difference of the encoding information of the picture elements of the image segment and the encoding information of the preceding picture elements of the preceding image segment, a check is carried out at least once to see whether the difference of the encoding information in more picture elements than a first plurality is greater than a third threshold;

the image segment is subjected to the residual error encoding and to the entropy encoding when the difference of the encoding information a more picture elements than the first plurality is greater than the third threshold.

15. An apparatus according to claim 14, wherein the processor unit is configured such that for determining the topical expanse of the difference of the encoding information, a check is carried out in a plurality of steps to see whether the difference of the encoding information in more picture elements than a further plurality is greater than a further threshold;

the image segment is subjected to the residual error encoding and to the entropy encoding when the difference of the encoding information in more picture elements than a further plurality is greater than the further threshold.

16. An apparatus according to claim 14, wherein the processor unit is configured such that at least one of the pluralities and at least one of the thresholds are adaptively fashioned.

17. An apparatus according to claim 14, wherein the processor unit is configured such that at least one of the pluralities and the third threshold and further thresholds are fashioned adaptively dependent on a quantization parameter.

18. An apparatus for encoding a digitized image with image segments that include picture elements to which an encoding information is allocated, upon employment of a stored, chronologically preceding image with preceding image segments that have preceding picture elements to which preceding encoding information is allocated, comprising:

a processor unit that is configured such that:
- a preceding image segment is selected proceeding from a predetermined start vector with which a topical shift of the image segment relative to the preceding image segment is indicated;
- an error criterion between encoding information of the image segment and preceding encoding information of the preceding image segment is formed;
- a check is carried out to see whether the error criterion is smaller than a first threshold;
- when the error criterion is smaller than the first threshold, the image segment is not subjected to any residual error encoding;
- otherwise, the image segment is subjected to the residual error encoding and an entropy encoding;
- the processor unit being further configured such that the weighting ensues such that differences of encoding information of picture elements that are located in an edge region of prescribable size of an image segment are weighted higher then differences of encoding information of picture elements outside the edge region.

* * * * *